United States Patent

Su et al.

Patent Number: 5,203,879
Date of Patent: Apr. 20, 1993

[54] FUEL COMPOSITION

[75] Inventors: Wei-Yang Su, Austin, Tex.; Sheldon Herbstman, New City; Joseph M. Russo, Poughkeepsie, both of N.Y.; Robert L. Zimmerman; Michael Cuscurida, both of Austin, Tex.

[73] Assignee: Texaco Inc., White Plains, N.Y.

[21] Appl. No.: 938,806

[22] Filed: Sep. 1, 1992

[51] Int. Cl.$^5$ ............................. C10L 1/18; C10L 1/22
[52] U.S. Cl. ........................................ 44/419; 44/334
[58] Field of Search ........................... 44/418, 419, 334

[56] References Cited

U.S. PATENT DOCUMENTS

| | | | |
|---|---|---|---|
| 3,989,476 | 11/1976 | Abbott | 44/334 |
| 4,412,846 | 11/1983 | Abbott | 44/334 |
| 4,477,261 | 10/1984 | Sung | 44/419 |
| 4,600,409 | 7/1986 | Campbell | 44/419 |
| 5,035,719 | 7/1991 | Sung et al. | 44/334 |

Primary Examiner—Jacqueline Howard
Attorney, Agent, or Firm—Robert B. Burns; James J. O'Loughlin

[57] ABSTRACT

An amido alkanolamine composition obtained by reacting, at a temperature of 10° C.–200° C.:
(a) a 4-alkyl-2-morpholinone represented by the formula:

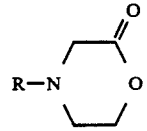

in which R represents a monovalent aliphatic radical having from 1 to 10 carbon atoms, and
(b) a hydrocarbyl oxypolyoxyalkylene amine represented by the formula:

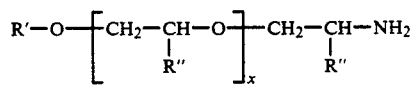

in which R' represents an alkyl, an alicyclic, or a alkylalicyclic radical having from 8 to 30 carbon atoms, x has a value from 5 to 50, and R" represents a methyl radical or a mixture of hydrogen and methyl radicals is provided.

11 Claims, No Drawings

FUEL COMPOSITION

BACKGROUND OF THE INVENTION

1. Field of the Invention

This invention relates to a novel additive composition for use in motor fuels. The additive comprises the reaction product obtained by reacting a 4-alkyl-2-morpholinone with an alkoxypolyoxyalkylene amine to produce a motor fuel—soluble amido alkanolamine compound which provides a number of valuable properties in a motor fuel composition.

The combustion of a hydrocarbon motor fuel in an internal combustion engine leads to the formation and accumulation of deposits on various parts of the combustion chamber as well as on the fuel intake and exhaust system of the engine. The presence of deposits in the combustion chamber seriously reduces the operating efficiency of the engine. First, deposit accumulation within the combustion chamber inhibits heat transfer between the chamber and the engine cooling system. This leads to higher temperatures within the combustion chamber, resulting in increases in the end gas temperature of the incoming charge. Consequently, end gas auto-ignition occurs causing engine knock. In addition, the accumulation of deposits within the combustion chamber reduces the volume of the combustion zone, causing a higher than design compression ratio in the engine. This, in turn, can also lead to engine knocking. A knocking engine does not effectively utilize the energy of combustion. Moreover, a prolonged period of engine knocking can cause stress fatigue and wear in pistons, connecting rods, bearings and cam rods of the engine. The phenomenon noted is characteristic of gasoline powered internal combustion engines. It may be overcome by employing a higher octane gasoline which resists knocking for powering the engine. This need for a higher octane gasoline as mileage accumulates has become known as the engine octane requirement increase (ORI) phenomenon. It is particularly advantageous if engine ORI can be substantially reduced or eliminated by preventing or modifying deposit formation in the combustion chambers of the engine.

Another problem common to internal combustion engines is the formation of intake valve deposits. Intake valve deposits interfere with valve closing and eventually will lead to valve burning. Such deposits interfere with valve motion and valve seating and tend to reduce the volumetric efficiency of the engine and to limit the maximum design power. Valve deposits may be produced from thermally and oxidatively unstable fuel or from lubricating oil oxidation products. The hard carbonaceous deposits produced collect in the tubes and runners that are part of the exhaust gas recirculation (EGR) flow. These deposits are believed to be formed from exhaust particles which are subjected to rapid cooling while mixing with the air-fuel mixture. Reduced EGR flow can result in engine knock and in nitric oxide, $NO_x$, emission increases. It would therefore be desirable to provide a motor fuel composition which minimizes or overcomes the formation of intake valve deposits.

2. Disclosure Statement

U.S. Pat. No. 4,747,851 discloses a noval polyoxyalkylene diamine compound of the formula:

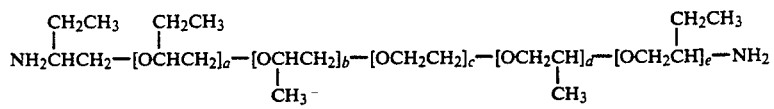

where c has a value from about 5-150, b+d has a value from about 5-150, and a+e has a value from about 2-12. Motor fuel compositions comprising the novel polyoxyalkylene diamine, alone or in combination with a polymer/copolymer additive are also disclosed.

U.S. Pat. No. 4,659,337 discloses the use of the reaction product of maleic anhydride, a polyether polyamide containing oxyethylene and oxypropylene ether moieties, and a hydrocarbyl polyamine in a gasoline motor fuel to reduce engine ORI and provide carburetor detergency.

U.S. Pat. No. 4,659,336 discloses the use of the mixture of (i) the reaction product of maleic anhydride, a polyether polyamine containing oxyethylene and oxypropylene ether moieties and a hydrocarbyl polyamine, and (ii) a polyolefin polymer/copolymer as an additive in motor fuel compositions to reduce engine ORI.

U.S. Pat. 4,631,069 discloses an alcohol-containing motor fuel composition which additionally comprises an anti-wear additive which is the reaction product of a dibasic acid anhydride, a polyoxyisopropylene diamine of the formula:

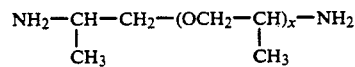

where x has a value of 2-68, and an N-alkyl-alkylene diamine.

U.S. Pat. No. 4,643,738 discloses a motor fuel composition comprising a deposit-control additive which is the reaction product of a dibasic acid anhydride, a polyoxyisopropylene diamine of the formula:

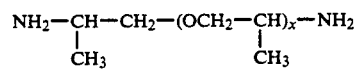

where x has a value of 2-50, and an N-alkyl-alkylene diamine.

U.S. Pat. No. 4,604,103 discloses a motor fuel deposit control additive for use in internal combustion engines which maintains cleanliness of the engine intake system without contributing to combustion chamber deposits or engine ORI. The additive disclosed is a hydrocarbyl polyoxyalkylene polyethylene amine of molecular weight range 300-2,500 having the formula:

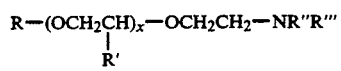

where R is a hydrocarbyl radical of from 1 to about 30 carbon atoms; R' is selected from methyl and ethyl; x is an integer from 5 to 30, and R" and R'" are independently selected from hydrogen and —($CH_2CH_2N$-H)y—H, where y is an integer from 0 to 5.

U.S. Pat. No. 4,581,040 discloses the use of a reaction product as a deposit-inhibitor additive in fuel compositions. The reaction product is the condensation product of the process comprising (i) reacting a dibasic acid anhydride with a polyoxyisopropylene diamine of the formula:

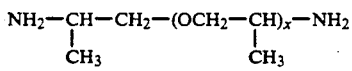

where x is a numeral of about 2-50, thereby forming a bismaleamic acid; (ii) reacting said maleamic acid with a polyalkylene polyamine, thereby forming a condensate product; and (iii) recovering said condensate product.

Co-pending application Ser. No. 07/896,700 discloses alkylphenoxypolyoxyalkylene amidoalkanolamines.

U.S. Pat. No. 4,357,148 discloses a motor fuel additive useful in controlling ORI which is the combination of (a) an oil-soluble aliphatic polyamine containing at least one olefinic polymer chain, and (b) a polymer, copolymer, or corresponding hydrogenated polymer or copolymer of a $C_2$-$C_6$ mono-olefin with a molecular weight of 500-1,500.

U.S. Pat. No. 4,234,321 discloses a hydrocarbyl-poly(oxyalkylene) ureylene carbamate as a deposit control additive for fuels.

EP 297996 discloses an alkylphenylpoly(oxypropylene) aminocarbamate having a molecular weight ranging from 600 to 6000 for use in gasoline or diesel fuel compositions.

An object of this invention is to provide a novel additive reaction product which may be employed in fuel compositions and particularly in a motor fuel composition.

Another object is to provide a fuel additive reaction product and a motor fuel composition which inhibits the formation of intake valve deposits in an internal combustion engine.

Another object of this invention is to provide a fuel additive and a fuel composition which inhibits or reduces the formation of combustion chamber deposits in an internal combustion engine.

Yet another object of this invention is to provide a concentrate composition which may be added to a motor fuel to provide motor fuel compositions of the instant invention.

SUMMARY OF THE INVENTION

The intake valve and combustion chamber deposit-inhibiting additive of the invention is the reaction product prepared by reacting a 4-alkyl-2-morpholinone with an alkoxypolyoxyalkylene amine. The 4-alkyl-2-morpholinone reactant used to prepare the reaction product additive of the instant invention may be represented by the formula:

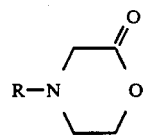

in which R represents a monovalent aliphatic radical having to 1 to 10 carbon atoms.

The hydrocarbyl oxypolyoxyalkylene amine reactant may be represented by the formula:

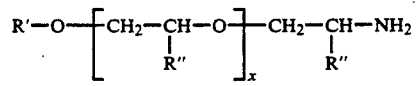

in which R' represents an alkyl, an alicyclic, or an alkylalicyclic radical having from 12 to 30 carbon atoms, x has a value from about 5 to 50, and R" represents a methyl radical or a mixture of hydrogen and methyl radicals.

The final reaction product may be represented by the formula:

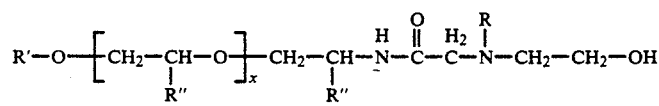

in which R, R', R", and x have the values noted above.

The motor fuel composition of the invention comprises a mixture of hydrocarbons in the gasoline boiling range and a minor amount of the prescribed intake valve and combustion chamber deposit-inhibiting emulsion resistant additive of the invention.

DETAILED DESCRIPTION OF THE INVENTION

The intake valve and combustion chamber deposit-inhibiting additive of the invention is the reaction product of a 4-alkyl-2-morpholinone and an alkoxypolyoxyalkylene amine. The 4-alkyl-2-morpholinone used to prepare the reaction product additive of the instant invention may be represented by the formula:

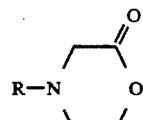

in which R represents a monovalent aliphatic radical having from 1 to 10 carbon atoms. Preferably, R is an alkyl radical having from 1 to 4 carbon atoms and most preferably having from 1 to 3 carbon atoms. Specific compounds within the prescribed formula which may be employed include 4-methyl-2-morpholinone, 4-ethyl-2-morpholinone, and 4-isopropyl-2-morpholinone.

The hydrocarbyl oxypolyoxyalkylene amine reactant is represented by the formula:

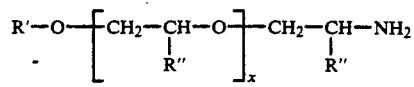

in which R' is an alkyl, an alicyclic, or an alkylalicyclic radical having from about 8 to 30 carbon atoms, x represents a number from about 5 to 50, and R" represents a methyl radical or a mixture of hydrogen and methyl radicals. R' may be a straight chain, an isomeric branched chain, or a cyclo aliphatic hydrocarbyl radical including mixtures of these. Typical monovalent alkyl radicals include normal $C_{16}$–$C_{18}$ alkyl, $C_{12}$–$C_{20}$ alkyl, n-nonylcyclohexyl, n-oligomeric species with a chain length of $C_{20}$–$C_{30}$. Preferably, R' represents a saturated monovalent aliphatic radical having from about 12 to 24 carbon atoms, and more preferably an aliphatic radical having from about 14 to 20 carbon atoms. A preferred value for x is from about 6 to 30, with the most preferred value being from about 10 to 20.

As indicated above, the internal radical represented by the formula:

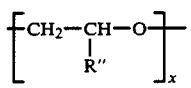

may be a propylene oxide radical or a mixture of propylene oxide and ethylene oxide radicals. When a mixture of propylene oxide and ethylene oxide radicals are used, the ratio of propylene oxide radicals to ethylene oxide radicals employed may range from about 2:3 to 9.99:0.01. A more preferred mole ratio range of propylene oxide to ethylene oxide is from about 7:3 to 9.99:0.01.

The 4-alkyl-2-morpholinone reactant and the alkoxypolyoxyalkylene amine reactant are reacted in about a 1:1 mole ratio. While other mole ratios are contemplated, no significant advantage is realized in departing from about equimolar reaction ratios.

The additive reaction product of the invention may be represented by the formula:

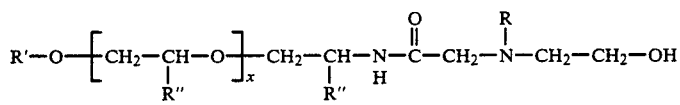

in Which R, R', R" and x have the values noted above.

The following examples illustrate the preparation of the additive of the invention.

EXAMPLE I

A. Preparation of 13.5 Mole Propylene Oxide Adduct of Aliphatic Alcohol

Into a 10-gallon kettle were charged 15 pounds of a mixture of $C_{16}$ and $C_{18}$ aliphatic alcohols and 136.5 grams of 45 percent potassium hydroxide. The reactor was then purged with pre-purified nitrogen. Maintaining a nitrogen purge, the reactor was heated to 110° C. and dried to a water content of less than 0.1 percent using both vacuum and nitrogen stripping. Propylene oxide (45.9 lbs.) was then reacted at 110°–115° C. at 50 psig over a nine-hour period. The reaction mixture was then digested to an equilibrium pressure and purged with nitrogen for 30 minutes. The alkaline product was then neutralized at 95° C. by stirring for two hours with 369 grams of Magnesol 30/40 adsorbent which was added as an aqueous slurry. After neutralization, the product was vacuum stripped to a minimum pressure, nitrogen stripped, and filtered. Properties of the finished product are given in Table I below.

TABLE I

| Properties | |
|---|---|
| Acid no., mg KOH/g | 0.004 |
| Hydroxyl no. mg KOH/g | 58.7 |
| Water, wt. % | 0.02 |
| Ph in 10:6 isopropanol-water | 6.8 |
| Color, Pt—Co | 125 |
| Sodium, ppm | 2.5 |
| Potassium, ppm | 1.8 |
| Viscosity, 100° F., cs | 53.7 |

B. Preparation of Alkoxypolyoxypropylene Amine

To a tubular reactor filled with 600 milliliters of a nickel catalyst was fed 0.4 lb/hr of the alcohol (Preparation A above), 0.4 lb/hr of ammonia, and 27 L/hr of hydrogen. The reactor was at 2000 psig and 205° C. The crude reactor effluent was charged to a clean dry kettle. It was then nitrogen stripped to 75° C. then placed under vacuum and heated to 100° C. The product had the following analysis:

| | meq/gram |
|---|---|
| Total acetylatables | 1.08 |
| Total amine | 1.05 |
| Primary amine | 1.04 |

C. Preparation of the Reaction Product of 4-Methyl-2Morpholinone and Alkoxypolyoxypropylene Amine To a 2-liter, three-necked flask equipped with a thermometer, stirrer, and nitrogen outlet was charged 1563 grams of alkoxypolyoxypropylene amine (Preparation B) and 189 grams of 4-methyl-2-morpholinone. The mixture was heated to 150° C. for three hours. The resulting product had the following analysis:

| | meq/gram |
|---|---|
| Total acetylatables | 1.04 |
| Total amine | 1.00 | and may be represented by the formula:

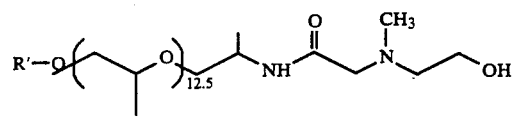

where R' represents a $C_{16}$–$C_{18}$ aliphatic radical.

EXAMPLE II

A reaction product was prepared similar to Example I except that 13.5 moles of propylene oxide with nonylcyclohexanol was employed in the reaction in making Preparation A. The resulting product is represented by the following formula:

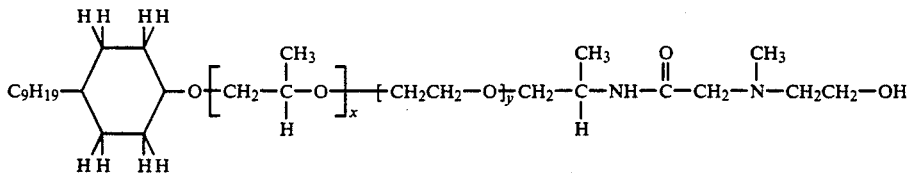

in which x=12.5 and y=o.

EXAMPLE III

A reaction product was prepared similar to Example I except 13.8 moles of a mixture of ethylene oxide and propylene oxide with a mixture of $C_{16}$ and $C_{18}$ aliphatic alcohols (EPAL 1618) were employed in the reaction making Preparation A. This product may be represented by the following formula:

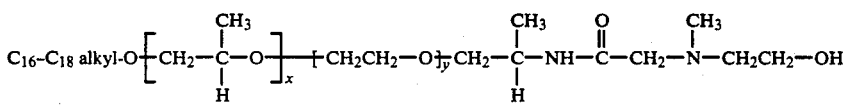

in which x has a value of 9.7 and y has a value of 4.2.

EXAMPLE IV

Example IV was prepared similar to Example III, except that x had a value of 8.9 and y had a value of 1.7.

The additive of the invention was tested in motor fuels in comparison to commercial fuel compositions to demonstrate its effectiveness for reducing intake valve deposits and combustion chamber defaults.

Honda Generator Test

A test was developed to determine the intake valve detergency of an additive as well as to determine whether the additive will cause the intake valves to stick.

In small four-cylinder gasoline powered engines, the intake valves accumulate large amounts of deposits which interfere with the operation of the engine. A good detergent/dispersant is required to prevent the buildup of these deposits. The Honda Generator test was developed to measure the activity of additives in preventing the buildup of intake valve deposits (IVD) (keep clean). The measurements are done in two ways: (1) the intake valves at the end of the run are rated using the CRC method of rating (a valve with a rating of 10 is perfectly clean, and a valve rating of 6 or less denotes heavy deposit levels); and (2) intake valve deposit weights are obtained and also reported in grams.

Test Equipment

The Intake System Deposit/Intake Valve Stickiness Test consists of an electrical generator driven by a current technology gasoline engine, similar in many characteristics to modern vehicle engines. The generator set design allows the engine to be easily loaded by using the electrical generator as a dynamometer for the engine. The set operates at a governed speed of 3600 rpm and incorporates a twin cylinder, overhead camshaft, water-cooled engine described below in Table II.

TABLE II

| Engine Data for ES6500 Honda Generator | |
|---|---|
| Type: 4-stroke | Overhead cam, 2 cylinder |
| Cooling System: | Liquid cooled |

TABLE II-continued

| Engine Data for ES6500 Honda Generator | |
|---|---|
| Displacement: | 359 cc |
| Bore × Stroke: | 58 × 68 mm |
| Construction: | Aluminum head and block, fixed cast iron cyclinder liners |
| Compression: | 8.5:1 |
| Maximum Power: | 9.1 Kw/3600 rpm |
| Maximum Torque: | 240 kg-cm |
| Fuel System: | Carburetor |
| Recommended Fuel: | Unleaded gasoline with min 86 (R + M)/2 octane |

TABLE III

| Honda Test Results | | |
|---|---|---|
| | Example I | Commercial Additive |
| CRC Valve Rating | 9.60 | 6.03 |
| IVD Weight, grm. | 0.004 | 0.269 |
| Stickiness | None | None |

The motor fuel containing the additive of the invention gave excellent CRC valve ratings, virtually no deposits on the intake valves (4 mg or less), and exhibited no stickiness. The commercial additive package showed a relatively poor CRC rating and had 269 mg IVD deposits. The commercial additive was free of valve stickiness. In this test, the additive of Example I in a motor fuel demonstrated excellent detergency and intake valve deposit keep clean properties.

The premium motor fuel described above was employed in further Honda Engine studies testing the various additives of the invention. Fuel compositions were prepared and evaluated neat at 100 PTB. The engine test involved running the test fuel in the engine for 80 hours. The engine was then dismantled and CRC ratings given for intake valve deposits (IVD), deposits weight, piston crown rating (PC), combustion chamber rating (CC) and a stickiness rating (PUSH) from light (L) to heavy (H). The test results are given in Table IV below.

TABLE IV

| Honda Generator Study of Structure to Detergency | | | | | | |
|---|---|---|---|---|---|---|
| | | Combustion Chamber CRC Rating | | Intake | Avg. Wt. | Valve |
| Run | PTB[1] | PC[2] | CC[3] | CRC | (mg) | Lbs. |
| Commercial Fuel Additive | 377 | 7.56 | 7.42 | 9.80 | 5.5 | 1.8 |
| Commercial polyether amine | 150 | 8.20 | 8.24 | 9.90 | 3.8 | 0.2 |
| Example I | 100 | 7.55 | 8.58 | 9.65 | 4.3 | 0.5 |
| Example II | 100 | 7.77 | 8.36 | 9.85 | 7.5 | 0.20 |

TABLE IV-continued
Honda Generator Study of Structure to Detergency

| Run | Combustion Chamber CRC Rating | | | Intake CRC | Avg. Wt. (mg) | Valve Lbs. |
|---|---|---|---|---|---|---|
| | PTB[1] | PC[2] | CC[3] | | | |
| Example III | 100 | 7.71 | 8.18 | 9.85 | 0.1 | 0.04 |
| Example IV | 100 | 8.38 | 8.33 | 9.8 | 5.5 | 0.4 |

[1]PTB = Pounds per Thousand Barrels
[2]PC = Piston Crown
[3]CC = Combustion Crown

Combustion Chamber Deposit Test

A Ford 5.0 liter engine was set up to determine combustion chamber deposit levels and intake valve deposit levels for gasoline additives. Results indicate that 6835-5 (this invention) gives equivalent combustion chamber deposit weights as unleaded base fuel. Valve deposit weight is considerably below that of base fuel.

TABLE V
Detergency of Three Experimental Polyether Amines Test in the Ford 5.0 L Combustion Chamber Test

| Experimental Polyether Amine | Piston Top (g) | Combustion Chamber (g) | Valve Deposits (mg) |
|---|---|---|---|
| Example I | 1.3021 | 0.8650 | 52.4 |
| Commercial Fuel Additive | 1.1889 | 1.0468 | 16.3 |
| Unleaded Base Fuel | 1.0879 | 0.8935 | 123.7 |

Thermal Gravimetric Analysis (TGA)

TGA establishes the uniqueness of the hydrocarbyl oxypolyoxyalkene morpholinones of the invention. Examination of TGA data in Table VI below indicates that Run 2 (Example I) is considerably more thermally labile than the products tested in Runs 1, and 3 to 5, inclusive. For example, at 200° C 85.5% of Example I is decomposed, compared to 41.4-61.1 for Runs 1, 3 and 4, and only 34.5% for Run 5. Only 4.3% residue remains for Run 2 (Example I) at 295° C., indicating that it does not leave appreciable residue. Therefore, this polyether aminemorpholinone detergent should leave very clean intake valves and combustion chambers since it does not leave much deposits.

TABLE VI

| Run | | % Volatility Loss | |
|---|---|---|---|
| | | 200° C. | 295° C. |
| 1 | Competitive Additive | 41.4 | 95.5 |
| 2 | Example I | 85.5 | 95.7 |
| 3 | Commercial Additive polyether amine | 61.1 | 95.1 |
| 4 | Commercial Additive | 54.3 | 89.2 |
| 5 | Commercial Additive oligomeric polyamine | 34.5 | 62.8 |

The above results demonstrate that the additive of the invention, Run 2, has an enhanced rate of decomposition as compared to commercial additives, and this property leads to surprisingly clean engine combustion chambers.

What is claimed is:

1. An amido alkanolamine composition obtained by reacting, at a temperature of 10° C.-200° C.:
   (a) a 4-alkyl-2-morpholinone represented by the formula:

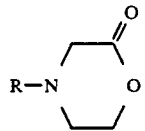

in which R represents a monovalent aliphatic radical having from 1 to 10 carbon atoms, and
   (b) a hydrocarbyl oxypolyoxyalkylene amine represented by the formula:

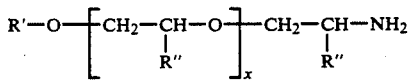

in which R' represents an alkyl or an alicyclic radical having from 8 to 30 carbon atoms, x has a value from 5 to 50, and R" represents a methyl radical or a mixture of hydrogen and methyl radicals.

2. A composition according to claim 1 in which R represents a methyl radical.

3. A composition according to claim 1 in which R represents an isopropyl radical.

4. A composition according to claim 1 in which R, represents a monovalent aliphatic radical having from 8 to 30 carbon atoms.

5. A composition according to claim 1 in which x has a value from about 10 to 20.

6. A composition according to claim 1 in which the alkylene oxide radical in said alkoxypolyoxyalkylene amine is propylene oxide.

7. A composition according to claim 1 in which the alkylene oxide radical in said alkoxypolyoxyalkylene amine consists of a mixture of propylene oxide and ethylene oxide in a mole ratio range from 2:3 to 9.99:0.01.

8. A composition according to claim 7 in which the mole ratios of propylene oxide to ethylene oxide range from 7:3 to 9.99:0.01.

9. A fuel composition containing from about 0.00015 to 1 weight percent of an amino reaction product prepared by reacting a 4-alkyl-2-morpholinone represented by the formula:

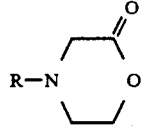

in which R represents a monovalent aliphatic radical having from 1 to 10 carbon atoms, with an alkoxypolyoxyalkylene amine reactant represented by the formula:

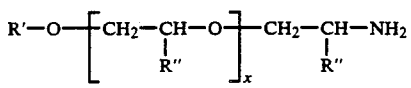

in which R' represents a hydrocarbyl radical having from 8 to 30 carbon atoms, R" represents a methyl radical or a mixture of hydrogen and methyl radicals, and x has a value from 5 to 50.

10. A fuel composition according to claim 10 in which said fuel is a mixture of hydrocarbons in the gasoline boiling range.

11. A method for preparing an amido alkanolamine composition represented by the formula:

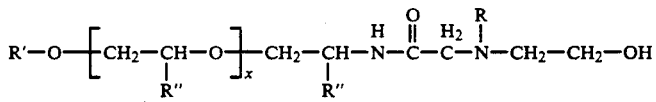

in which R represents a monovalent aliphatic radical having to 10 carbon atoms, R' represents hydrocarbyl radical having from 8 to 30 carbon atoms, x has a value from 5 to 50, and R" represent a methyl radical or a mixture of hydrogen and methyl radicals in which the ratio of methyl radicals to hydrogen ranges from 2:3 to 9.99:0.01 which comprises reacting a 4-alkyl-2-morpholinone represented by the formula:

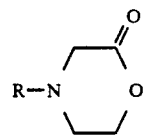

with an alkylphenoxypolyoxyalkylene amine reactant represented by the formula:

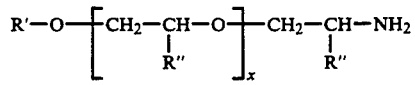

on which R, R', R" and x have the values noted above.

* * * * *